United States Patent Office 2,843,560
Patented July 15, 1958

2,843,560

CURED SILICON-CONTAINING PRODUCTS PREPARED FROM POLYEPOXIDES

Thomas F. Mika, Orinda, Calif., assignor to Shell Development Company, New York, N. Y., a corporation of Delaware No Drawing. Application April 30, 1954
Serial No. 426,909

2 Claims. (Cl. 260—42)

This invention relates to a new class of silicon-containing materials. More particularly, the invention relates to novel silicon-containing resinous products prepared from polyepoxides, and to their utilization, preferably in the preparation of improved coating compositions.

Specifically, the invention provides new and particularly useful silicon-containing resinous products prepared by reacting a polyepoxide, and preferably a glycidyl polyether of polyhydric alcohol or polyhydric phenol, with an organic silicon-containing compound possessing at least one hydrogen atom reactive with an epoxy group. The invention further provides resinous products obtained by curing the above-described silicon-modified polyepoxides, preferably through the remaining epoxy groups and/or formed OH groups.

Polyepoxides, such as the glycidyl polyethers of polyhydric phenols, have shown considerable promise in the preparation of coating compositions, adhesives, and the like. Many of these polyepoxides, however, have certain undesirable characteristics which have placed a restriction on their commercial applications in these fields. Some of the polyepoxides have limited compatibility with coating resins and polymers. Many of the polyepoxides also form films which lack the degree of distensibility and flexibility required for many applications. Many of the polyepoxides also form films which lack the desired degree of water resistance and, on extended exposure to outdoor conditions, tend to powder or chalk.

It is, therefore, an object of the invention to provide a new class of resinous products from polyepoxides. It is a further object to provide silicon-modified polyepoxides and a method for their preparation. It is a further object to provide silicon-modified polyepoxides that can be cured to form products having improved flexibility. It is a further object to provide silicon-modified polyepoxides that form films having improved resistance to water and improved resistance to chalking. It is a further object to provide silicon-containing polyepoxides that have good solubility and compatibility characteristics. It is a further object to provide silicon-containing polyepoxides that are particularly valuable and useful in the preparation of coating compositions, adhesives and sealing compositions. Other objects and advantages of the invention will be apparent from the following detailed description thereof.

It has now been discovered that these and other objects may be accomplished by the novel products of the invention comprising resinous products obtained by reacting a polyepoxide, and preferably a glycidyl polyether of a polyhydric phenol or polyhydric alcohol, with an organic silicon-containing compound possessing at least one hydrogen atom reactive with an epoxy group. It has been found that these particular products have good solubility and compatibility characteristics and can be used in combination with a wide variety of solvents and resins to produce coating and adhesive compositions having excellent physical properties. The cured films prepared from these modified polyepoxides are hard and durable and have excellent flexibility and distensibility. In addition, the cured films have improved water resistance and improved resistance to chalking. Many of these outstanding properties of the novel silicon-modified polyepoxides are illustrated in the examples at the end of the specification.

The polyepoxides used in the praparation of the novel products of the invention include all those organic materials having at least two epoxy

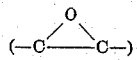

groups per molecule. The polyepoxides may be saturated or unsaturated, aliphatic, cycloaliphatic, aromatic or heterocyclic and may be substituted if desired with other substituents, such as ether radicals, and the like. They may also be monomeric or polymeric.

For clarity, many of the polyepoxides and particularly those of the polymeric type will be described throughout the specification and claims in terms of epoxy equivalent value. The term "epoxy equivalency" refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine at the boiling point for 20 minutes whereby the pyridinium chloride hydrochlorinates the epoxy groups to chlorohydrin groups. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

The monomeric-type polyepoxide compounds may be exemplified by the following: vinyl cyclohexene dioxide, butadiene dioxide, 1,4 - bis(2,3 - epoxypropoxy)benzene, 1,3-bis(2,3 - epoxypropoxy)benzene, 4,4'-bis(2,3 - epoxypropoxy)diphenyl ether, 1,8 - bis(2,3 - epoxypropoxy) octane, 1,4 - bis(2,3 - epoxypropoxy)cyclohexane and diglycidyl ether.

Other examples of this type include the glycidyl polyethers of the dihydric phenols obtained by reacting a polyhydric phenol with a great excess of a halogen containing epoxide in the presence of an alkaline medium. Thus, polyether A described hereinafter, which is substantially 2,2-bis(2,3-epoxypropoxyphenyl)propane is obtained by reacting bis-phenol(2,2-bis(4-hydroxyphenyl) propane) with an excess of epichlorohydrin as indicated below. Other polyhydric alcohols that can be used for this purpase include resorcinol, catechol, hydroquinone, methyl resorcinol, or polynuclear phenols, such as 2,2-bis-(4-hydroxyphenol)butane, 4,4'-dihydroxybenzophenone, bis(4-hydroxyphenyl)ethane, 2,2 - bis(4 - hydroxyphenyl) pentane, and 1,5-dihydroxynaphthalene.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinylmethallyl pimelate. Illustrative examples of these polymers include poly(allyl 2,3-epoxy-propyl ether), poly (2,3-epoxypropyl crotonate), allyl 2,3-epoxypropyl ether-styrene copolymer, methylallyl 3,4-epoxybutyl ether-allyl benzoate copolymer, poly(vinyl 2,3-epoxypropyl ether), allyl glycidyl ether-vinyl acetate copolymer and poly-(4-glycidyloxystyrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred polyepoxides are the monomeric and polymeric-type glycidyl polyethers of dihydric phenols obtained by reacting epichlorohydrin with a dihydric phenol in an alkaline medium. The monomer products of this type may be represented by the general formula

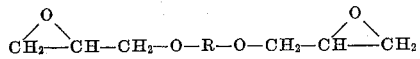

wherein R represents a divalent hydrocarbon radical of the dihydric phenol.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

*Polyether A*

About 2 moles of bis-phenol was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as polyether A.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' mercury method softening point no greater than 60° C.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Also of special interest are the polyglycidyl polyethers of polyhydric alcohols obtained by reacting the polyhydric alcohol with epichlorohydrin, preferably in the presence of 0.1% to 5% of an acid-acting compound, such as boron trifluoride, hydrofluoric acid or stannic chloride. This reaction is effected at about 50° C. to 125° C. with the proportions of reactants being such that there is about one mole of epichlorohydrin for every equivalent of hydroxyl group in the polyhydric alcohol. The resulting chlorohydrin ether is then preferably dehydrochlorinated by heating at about 50° C. to 125° C. with a small, e. g., 10% stoichiometrical excess of a base, such as sodium aluminate.

The preparation of the polyglycidyl ethers of polyhydric alcohols may be illustrated below.

PREPARATION OF GLYCIDYL POLYETHERS OF POLYHYDRIC ALCOHOLS

*Polyether B*

About 276 parts (3 moles) of glycerol was mixed with 832 parts (9 moles) of epichlorohydrin. To this reaction mixture was added 10 parts of diethyl ether solution containing about 4.5% boron trifluoride. The temperature rose as a result of the exothermic reaction and external cooling with ice water was applied to keep the temperature between about 50° C. and 75° C. during a reaction period of about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 200 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was, therefore, about 2.13. For convenience, this product will be referred to hereinafter as polyether B.

Particularly preferred members of this group comprise the glycidyl polyethers of the aliphatic polyhydric alcohols containing from 2 to 10 carbon atoms, and more preferably the alkanediols and alkanetriols containing from 2 to 8 carbon atoms. Such products preferably having an epoxy equivalency between 1.0 and 2.5 and a molecular weight between 300 and 1000.

Also preferred are the polymers and copolymers of the unsaturated epoxy-containing monomers, such as allyl glycidyl ether. These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

Polyether C

About 100 parts of allyl glycidyl ether was combined with an equal amount of benzene and the resulting mixture heated at 155° C. in the presence of 3% ditertiary-butyl peroxide. The solvent and unreacted monomer were then removed by distillation. The poly(allyl glycidyl ether) obtained as the resulting product had a molecular weight of about 481–542 and an epoxy value of 0.50 eq./100 g. For convenience, this product will be referred to hereinafter as polyether C.

Particularly preferred members of the above-described group comprise the polymers of the 2-alkenyl glycidyl ethers having a molecular weight between 300 and 1000 and an epoxy equivalency greater than 1.0, and preferably between 1.2 and 6.0.

Of special interest are the polyepoxides containing only carbon, hydrogen, oxygen and chlorine.

The silicon-containing material to be reacted with the above-described polyepoxides comprise organic silicon-containing materials having at least one, and preferably two or more, hydrogen atoms reactive with the epoxy group. The expression "organic silicon-containing materials" refers to those compounds possessing a silicon atom bonded directly to carbon or to carbon through an oxygen atom. The reactive hydrogen atoms present in these materials may be contained in groups as indicated hereinafter which are attached directly to silicon or they may be attached to organic radicals which, in turn, are bonded to silicon. The groups containing the reactive hydrogen may be exemplified by aliphatic and aromatic —OH groups, amine and amide groups, such as —NH$_2$, —NHR (wherein R is an organic radical), $$-\overset{\overset{O}{\|}}{C}NH_2, \quad -\overset{\overset{O}{\|}}{C}NHR$$

(wherein R is an organic radical), —COOH, —C≡CH, —SH, and the like. These groups react with the epoxy group so as to form an —OH group and attach the remaining portion of the molecule to the polyepoxide. Thus —R—SH reacts with the epoxy group to form the grouping

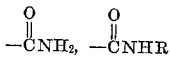

A preferred group of silicon-containing materials to be reacted with the above-described polyepoxides comprise those materials having one or more hydroxyl groups. Examples of these materials include those wherein the OH group or groups are attached directly to silicon, such as the silanols, i. e. compounds of the formulae $(R)_3SiOH$,

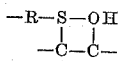

and

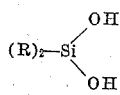

wherein R is an organic radical and preferably a hydrocarbon radical, such as an alkyl, alkenyl, cycloalkyl, aryl, alkaryl or aralkyl radical. Such material may be exemplified by triphenylhydroxysilane, triphenyloxyhydroxysilane, tricyclohexylhydroxysilane, dichlorphenyl-methylhydroxysilane, diphenyldihydroxysilane, dicyclohexyldihydroxysilane, phenyltolyldihydroxysilane, xylyltrihydroxysilane, phenyltrihydroxysilane, octyltrihydroxysilane, vinyltrihydroxysilane, and chlorophenyltrihydroxysilane. Particularly preferred methods of this group comprise the silanediols and silanetriols, and particularly the dialkylsilanediols, diarylsilanediols and dialkarylsilanediols containing no more than 15 carbon atoms.

Another preferred group of silicon-containing materials possessing one or more OH groups attached to silicon comprise the siloxanols, i. e., compounds of the formulae

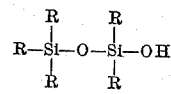

and

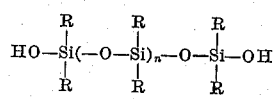

wherein R is an organic radical and preferably a hydrocarbon radical such as an alkyl, alkenyl, cycloalkyl, aryl, alkaryl, aralkyl radical, and $n$ is an integer from 0 to as high as 60 or more. Such materials may be exemplified by tetramethyldisiloxanediol

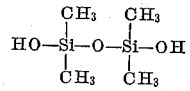

tetraphenyldisiloxanediol, tetraxylyldisiloxanediol, hexacyclohexyltrisiloxanediol, octaoctyltetrasiloxanediol, diphenyldimethyldisiloxanediol, dibutyldiethyldisiloxanediol and the like. Preferred members of this group comprise the organopolysiloxanediols, and particularly the polyalkylpolysiloxanediols, the polyarylpolysiloxanediols and the polycycloalkylpolysiloxanediols, which preferably contain no more than 12 carbon atoms in each aryl, alkyl or cycloalkyl radical.

Another preferred group of silicon-containing materials possessing one or more OH groups attached to silicon comprise those having two or more silicon atoms bound together through divalent organic radicals, such as those of the formula

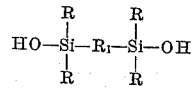

wherein R is another OH group or a hydrocarbon radical, preferably an alkyl, alkenyl, cycloalkyl, aryl, alkaryl or aralkyl radical, and $R_1$ is a divalent organic radical, such as methylene or polymethylene radical, arylene or polyarylene radical, cycloalkylene or polycycloalkylene radical, or aralkylene or polyaralkylene radicals, or oxa- or thia-substituted derivatives of the foregoing members. Examples of this group include, among others, ethylene bis(trihydroxysilane), p-phenylene-bis(dimethylhydroxysilane), p-cyclohexylene-bis(dibutylhydroxysilane), 1,6-hexamethylene-bis(dimethylhydroxysilane), and 1,5-pentamethylene-bis(dibutylhydroxysilane). Particularly preferred members of this group comprise the alkylene-bis(dihydrocarbylhydroxysilanes), the arylene-bis(dihydrocarbylhydroxysilanes), and the cycloalkylene-bis(dihydrocarbylhydroxysilanes). The preparation of many of these preferred silicon-containing compounds is illustrated in U. S. 2,561,429.

Still another preferred group of silicon-containing materials possessing one or more OH groups bonded directly to silicon comprise the hydroxy-containing esters obtained by reacting any of the above-described silicon-containing polyhydric alcohols with mono- or polycarboxylic acids so that at least one of the OH groups remains unesterified. Preferred members of this group comprise those of the formula

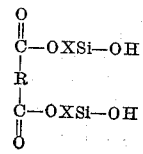

wherein R is a residue of polycarboxylic acids, such as phthalic acid, maleic acid, adipic acid, terapththalic acid, and the like, and X is the residue of the silicon-containing polyhydric alcohol as described above.

The hydroxyl-containing silicon materials that may be reacted with the above-described polyepoxides also include those wherein the hydroxyl group is attached to an organic radical which, in turn, is joined to the silicon atom. Examples of these materials include the organo silyl alcohols and phenols, such as those of the formulae $$R_aSi[(CH)_xOH]_b$$

and $$R_aSi[YOH]_b$$

wherein $a$ and $b$ are integers from 1 to 3 and the sum of $a+b$ is 4, $x$ is 1 to 5, R is an organic radical, preferably a hydrocarbon radical or hydrocarbyloxy radical, such as alkyl and aryl radicals and alkoxy and aryloxy radicals and Y is an aromatic hydrocarbon radical. Examples of these materials include, among others, bis(3-propanol)dimethylsilane, tris(3 - propanol)methylsilane, bis(4 - butanol)diphenylsilane, bis(5 - pentanol)ditolylsilane, bis(phenylol)dimethylsilane, and the like.

Other examples of the above-noted silicon-containing materials include those of the formulae $$R_aSi[O(CH_2)_xOH]_b$$

and

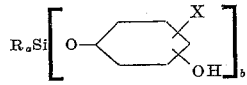

wherein R is an organic radical, preferably a hydrocarbon radical, such as alkyl and aryl radicals, $x$ is 1 to 5, X is hydrogen or alkyl radicals, $a$ and $b$ are integers from 1 to 3 and the sum of $a+b$ is 4. Examples of these materials include, among others, bis(4-hydroxyphenoxy)-dimethylsilane, tris(4-hydroxyphenoxy)dibutylsilane, bis-(4-hydroxy - 3 - methylphenoxy)dimethylsilane, bis(4-hydroxypentoxy)dimethylsilane and bis(3-hydroxypropoxy)-dimethylsilane.

Silicon-containing materials possessing a free —COOH group or groups which may be reacted with the polyepoxides according to the present invention may be exemplified by the triorganosilylalkanoic acids, such as those of the formula

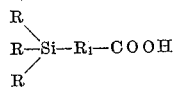

wherein R is an organic radical, preferably a hydrocarbon radical, and $R_1$ is a bivalent hydrocarbon radical. Examples of such acids include, among others, trimethylsilylbutyric acid, trimethylsilylvaleric acid, triphenylsilylhexoic acid, and triphenylsilylbutyric acid. The preparation of these acids is illustrated in U. S. 2,610,198.

Other silicon-containing materials possessing free —COOH group or groups which may be reacted with the polyepoxides include the triorganosilylbenzoic acids, such as those of the formula

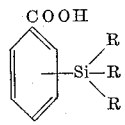

wherein R is an organic radical, and preferably a hydrocarbon radical, such as an alkyl, aryl, alkaryl, aralkyl, cycloalkyl, alkenyl and cycloalkenyl radicals. Examples of such acids include, among others, p-trimethylsilylbenzoic acid, p-triphenylsilylbenzoic acid, p-trioctylsilylbenzoic acid. The preparation of some of these acids is illustrated in J. A. C. S. 71, 2925 (1949).

The quantities of the reactants to be used in producing the novel products may vary over a wide range depending upon the nature of the desired product. If products having free epoxy groups are desired, the polyepoxide is combined with less than a chemical equivalent amount of the silicon-containing material. As used herein in relation to the amount of polyepoxide and silicon-containing material, the expression "chemical equivalent amount" refers to the amount of silicon-containing material needed to furnish one reactive hydrogen atom for every epoxy group. In the formation of these preferred epoxy-containing products, the silicon-containing material and polyepoxide are preferably combined in the chemical equivalent ratio of 1:1.5 to 3, and more preferably, in a chemical equivalent ratio of 1:2. If one desires to effect a reaction with all of the epoxy groups so that the resulting product may be cured or further reacted through the resulting hydroxyl groups, the silicon-containing material and polyepoxide are preferably combined in chemical equivalent ratios of 1:1 to 4:1, and more preferably in a chemical equivalent ratio of 2:1.

The reaction between the polyepoxide and the above-described silicon-containing materials may be accomplished by merely bringing the reactants together in a suitable reaction vessel and heating the resulting mixture. Temperatures employed will vary from about 50° C. to 250° C. In most cases, the polyepoxide and silicon-containing material will be quite reactive and temperatures of the order of about 50° C. to 125° C. will be sufficient to effect the desired reaction. In other instances, it may be necessary to employ higher temperatures, such as those of the order of 125° C. to 250° C. The reaction is preferably conducted under atmospheric pressure but it may be advantageous in some instances to employ subatmospheric or superatmospheric pressures.

Other materials, such as tertiary amines, may be added if desired to enhance the reaction between the polyepoxides and the silicon-containing materials. Examples of such materials include, among others, trimethylamine, tripropylamine, N-methyl dipropylamine, N-butyl diisopropylamine, N-(butoxymethyl) dimethylamine, N,N-diethyl N-butylamine, choline (trimethyl beta-hydroxyethyl ammonium hydroxide), and the like. These accelerators are preferably added in amounts varying from about .05% to 4% based on the weight of the silicon-containing materials, and more preferably from .1% to 2% based on the weight of the silicon-containing materials. The reaction has also been increased by the addition of $BF_3$ dihydrate complexes in amounts varying from about .05% to about 3% by weight of the silicon-containing materials.

The reaction may be conducted in the presence or absence of solvents or diluents. In most cases, the polyepoxide and/or the silicon-containing material will be liquid and the reaction may be easily effected without the addition of solvents or diluents. However, in some cases, where either or both reactants are solids, it may be desirable to add diluents to assist in effecting the reaction. Suitable solvents include toluene, benzene, dibutyl ether, and the like, and mixtures thereof.

At the completion of the reaction, the silicon-containing products may be recovered in a variety of methods obvious to those skilled in the art, such as solvent extraction, filtration, distillation, and the like.

The products of the invention produced by the aforedescribed process are viscous liquid to solid resinous materials. Due to the above-noted reaction through the epoxy group, all the products will contain free OH groups. They are soluble in various oils and solvents and are compatible with synthetic resins and polymers, such as vinyl polymers, cellulose derivatives and phenol-aldehyde type resins.

The products of the invention may also be cured through the various functional groups to produce useful and valuable polymeric products. The agent employed in the curing will depend upon the particular linkage or linkages involved in the cure. If the cure is to be effected through the remaining epoxy linkages, the agent employed may be any of the alkaline or alkaline-acting compounds, such as sodium and potassium hydroxide, sodium and potassium phenoxides, sodium methoxide, the amino compounds, such as triethylamine, ethylene diamine, diethylamine, 2,4,6-tri(dimethylaminomethyl)phenol, diethylene triamine, triethylene tetramine, pyridine, piperidine, dicyandiamide, melamine, and the like. They may also be cured through the epoxy group by treatment with acidic compounds, such carboxylic anhyrides as phthalic anhydride. If the cure is to be effected through OH groups, any of the known curing agents, such as polyisocyanates, methylol containing materials, such as urea and melamine-formaldehyde resins, and the like. The amount of catalyst to be used will vary over a considerable range. In general, the amount of catalyst will vary from about .1% to 25% by weight. For the alkalies or phenoxides, 0.1% to 4% is generally preferred. The amino compounds are preferably employed in amounts varying from 1% to 10%, while the isocyanates and methylol containing materials are generally employed in amounts varying from 2% to 40%.

Temperatures employed in the cure vary from room temperature up to 350° C. The cure is preferably accomplished at temperatures varying from about 50° C. to 250° C.

The resinous products of the invention may be employed with the aforedescribed curing agents to prepare improved surface coating compositions of the air-drying or baking type. In utilizing the products in this application, it is generally desirable to combine the resinous product and curing agent with the desired solvents or diluents and, if desired, other film-forming materials, and then apply the resulting mixture to the surface to be coated. Film-forming materials that can be used with the resinous products include the drying oils, such as tung oil, linseed oil, dehydrated castor oil, soybean oil, and the like; cellulose derivatives such as cellulose nitrate, cellulose acetate, cellulose acetate butyrate, cellulose propionate, ethyl cellulose, methyl cellulose, butyl cellulose, cellulose acetopropionate, and mixtures thereof; and vinyl polymers, such as vinyl chloride, vinylidene chloride, methyl methacrylate, diallyl phthalate, and the like polymers. The coatings prepared in the above manner may be allowed to set to a hard finish at room temperature or heat may be applied to hasten the cure.

The resinous products of the invention may also be employed with the aforedescribed curing agents to prepare valuable adhesive and impregnating compositions. In utilizing the products for these applications, it is generally desirable to combine the silicon-modified polyepoxide and curing agent with the desired solvent or diluent, such as benzene, toluene, acetonitrile, crotonitrile, and the like, and mixtures thereof, so as to form a spreadable fluid and homogeneous mixture, and then the mixture is applied to the desired surface. Adhesive compositions prepared in this manner are suitable for uniting various surfaces such as wood to wood, wood to metal, metal to metal, resins to resins, or any combination thereof. After the application has been made, the adhesive may be allowed to set at room temperature or heat may be applied to hasten the cure.

The resinous products of the invention may also be used in preparing pottings and castings for electrical apparatus. In actual practice of preparing pottings, the silicon-containing products are generally combined with the catalyst and the mixture poured into the mold or casting containing the electrical wires or apparatus and the mixture allowed to stand. Heat may also be applied to hasten curing.

The silicon-modified polyepoxides are particularly useful in the preparation of ester-type products. They may be reacted through the OH group formed by the opening up of the epoxy group or groups with monocarboxylic acids, such as, for example, acetic butyric, caproic capric, 2-ethylhexanoic, lauric, stearic, benzoic cyclohexanoic, isopropylbenzoic and tert-butylbenzoic acid, to form esters having value as plasticizers and resinous coatings.

The resinous products may also be further reacted with polyethylenic monocarboxylic acids to produce products having value in the preparation of coating compositions, such as varnishes, and the like. Examples of such acids are the rosin acids, as abietic acid, pimaric acid, acids derived from linseed, soyabean, perilla, oiticica, tung, walnut, and dehydrated castor oil, as well as the lower fatty acids, such as pentadienoic, hexadienoic and decadienoic acids.

The resinous products may also be reacted with polyfunctional acids or anhydrides, such as phthalic acid, isophthalic acid, terephthalic acid, malonic acid, succinic acid, adipic acid, maleic acid, chloromaleic acid, 1,2,4-butanetricarboxylic acid, and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in examples are parts by weight.

EXAMPLE I

This example illustrates the preparation of a polyether A-diphenylsilanediol reaction product and its use in preparing coating compositions.

About 17.7 parts of polyether A was combined with 21.6 parts of diphenylsilanediol and the mixture heated at 130° C. for several hours. The resulting product was a clear viscous solution.

About 75 parts of the polyether A-diphenylsilanediol reaction product was dissolved in an organic solvent and 25 parts of an urea-formaldehyde resin added thereto. This mixture was then spread on tin panels and baked at 150° C. for 30 minutes. Films prepared in this manner showed good flexibility and improved water resistance. The cured films passed an 800 hour exposure test (Fadometer) without chalking, while related films prepared from 75 parts of polyether A and 25 parts of the urea-formaldehyde resin baked at 150° C. for 30 minutes passed only 300 hours without chalking.

About 10 parts of the polyether A-diphenylsilanediol reaction product was dissolved in 10 parts of a solvent (80 parts methylcellosolve-20 parts xylene) and 1.8 parts of citric acid (dissolved in 3 parts of alcohol) added thereto. The resulting mixture was then spread as .005 inch film on glass plate and baked for 30 minutes at 175° C. The resulting product was a clear hard film having good resistance to water and good resistance against chalking.

About 10 parts of the polyether A-diphenylsilanediol reaction product produced above was dissolved in 10 parts of the same solvent and 1 part of lead-2-ethylhexoate added. This mixture was spread as a fine film on glass plate and allowed to cure at room temperature. The film cured in a short period to form a hard water-resistant coating.

Resinous reaction products having related properties may be obtained by replacing the diphenylsilanediol in the above-described preparation process with equivalent amounts of each of the following: ditolylsilanediol, dixylylsilanediol, phenyloctylsilanediol and di-(trifluoromethyl phenyl)silanediol.

Increased rates of reaction are obtained in the above process by adding .1% choline to the reaction mixture.

EXAMPLE II

This example illustrates the preparation of a polyether A-triphenylhydroxysilane reaction product and its use in preparing coating compositions.

About 17.7 parts of polyether A was combined with 13.9 parts of triphenylhydroxysilane and the mixture heated at 100° C. for several hours. The resulting product is a viscous colorless liquid.

About 10 parts of the polyether A-triphenylhydroxysilane reaction product was dissolved in a solvent made up of methyl cellulose and xylene and 1 part of ethylene diamine added thereto. The resulting mixture was spread on tin panels and baked for 30 minutes at 150° C. The resulting film has good flexibility and improved water resistance and improved resistance to chalking.

EXAMPLE III

This example illustrates the preparation of a polyether A-dimethyl-bis(p-phenylol)silane and its use in preparing coating compositions.

About 17.7 parts of polyether A was combined with 24.6 parts of dimethyl-bis(p-phenylol)silane and the mixture maintained at 100° C. for several hours. The resulting product was a clear viscous solution. Analysis indicates that the product has a probable structure of

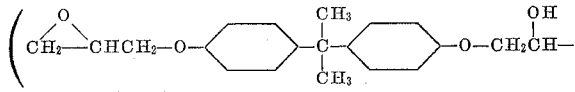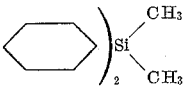

About 10 parts of the polyether A-dimethyl-bis(p-phenylol)silane is dissolved in 10 parts of a solvent (80 parts methylcellosolve-20 parts xylene) and 1.8 parts of phthalic anhydride. The resulting mixture is spread on glass panels and baked for 30 minutes at 150° C. The resulting product is a clear hard film having improved resistance to water and good resistance against chalking.

Resinous reaction products having related properties may be obtained by replacing the dimethyl-bis(p-phenylol)silane in the above-described preparation process with equivalent amounts of each of the following: dibutyl-bis(p-phenylol)silane, diphenyl-bis(p-phenylol)silane and dicyclohexyl-bis(p-phenylol)silane.

EXAMPLE IV

This example illustrates the preparation of a tetramethyl disiloxanediol-1,3-polyether A reaction product and its use in preparing coating compositions.

About 17.7 parts of polyether A is combined with 16.6 parts of tetramethyl disiloxanediol-1,3 (melting point 67° C.) and the mixture heated at 150° C. for several hours. The resulting product is a thick viscous liquid.

About 10 parts of the polyether A-tetramethyl disiloxanediol-1,3 reaction product produced above is dissolved in 10 parts of a solvent described in Example I and 2 parts of phthalic anhydride added thereto. The resulting mixture is then spread as a fine film on glass plate and baked for 30 minutes at 150° C. The resulting product is a clear hard film having improved resistance to water and good resistance against chalking.

Resinous products having related properties may be obtained by replacing the tetramethyl disiloxanediol-1,3 in the above preparation process with equivalent amounts of each of the following: tetraphenyl disiloxanediol-1,3, hexamethyl trisiloxanediol, and tetramethoxy disiloxanediol.

EXAMPLE V

A 50% solution (methyl Cellosolve) of the polyether A-diphenylsilanediol reaction product produced as shown in Example I was combined with a 10% solution (methyl ethyl ketone) of a polyvinyl acetal resin so as to form solutions having the polyvinyl acetal and reaction product in a ratio of 10:1, 1:1 and 1:10. In all cases, the resulting mixtures were clear homogeneous solutions. Each solution formed baked and air dried films which were hard and clear.

The above-noted excellent compatibility characteristics of the polyether A-diphenylsilanediol reaction product was quite unexpected in view of the fact that polyether A by itself is limited to a ratio of 20:1 (polyvinyl acetal to polyether A).

EXAMPLE VI

A 50% solution (methyl Cellosolve) of the polyether A-diphenylsilanediol reaction product produced as shown in Example I was also combined with a 20% solution (methyl ethyl ketone and toluene in a 1:1 ratio) of a copolymer of vinyl chloride and vinyl acetate containing at least 90% vinyl chloride (VAGH copolymer) so as to form solutions having the copolymer and the reaction product in a ratio of 10:1 and 1:1. In all cases, the mixtures were clear homogeneous solutions. Each solution formed baked and air dried films which were hard and clear.

EXAMPLE VII

A 50% solution (methyl Cellosolve) of the polyether A-diphenylsilanediol reaction product produced as shown in Example I was also combined with a 20% solution (methyl ethyl ketone and toluene in a 1:1 ratio) of a vinyl acetate homopolymer so as to form a solution having the polymer and reaction product in a ratio of 10:1. The resulting mixture was clear and homogeneous. Baked and air dried films of the solution were hard and clear.

I claim as my invention:

1. A resinous product obtained by reacting the diglycidyl ether of 2,2-bis(4'-hydroxyphenyl) propane with diphenylsilanediol.

2. A silicon-containing resinous product obtained by reacting a polyepoxide containing at least two groups of configuration

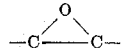

which groups are the only reactive groups in the polyepoxide, with a diarylsilanediol.

References Cited in the file of this patent

UNITED STATES PATENTS 2,687,396    McLean _____ Aug. 24, 1954
2,687,398    McLean _____ Aug. 24, 1954

OTHER REFERENCES

Narracott: British Plastics, October 1951, pages 341 and 342.